(12) United States Patent
Kim et al.

(10) Patent No.: US 11,378,472 B2
(45) Date of Patent: Jul. 5, 2022

(54) MULTI-TYPE PRESSURE SENSOR

(71) Applicant: Research & Business Foundation Sungkyunkwan University, Suwon-si (KR)

(72) Inventors: Tae-il Kim, Suwon-si (KR); Chanho Jeong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 210 days.

(21) Appl. No.: 16/861,465

(22) Filed: Apr. 29, 2020

(65) Prior Publication Data

US 2020/0370973 A1    Nov. 26, 2020

(30) Foreign Application Priority Data

May 21, 2019    (KR) .................. 10-2019-0059293

(51) Int. Cl.
    G01L 1/22    (2006.01)
(52) U.S. Cl.
    CPC ............ G01L 1/225 (2013.01); G01L 1/2275 (2013.01); G01L 1/2287 (2013.01)
(58) Field of Classification Search
    CPC ...... G01L 1/225; G01L 1/2275; G01L 1/2287
    See application file for complete search history.

(56) References Cited

U.S. PATENT DOCUMENTS

| 4,987,275 | A  | * | 1/1991 | Miller ................. | H01H 13/702 200/275 |
| 6,989,677 | B2 | * | 1/2006 | Morimoto ............ | G06F 3/0338 324/660 |
| 10,786,175 | B2 | * | 9/2020 | Jung .................... | A61B 5/0531 |
| 11,212,916 | B2 | * | 12/2021 | Edmundson ......... | H05K 1/0313 |
| 11,229,138 | B1 | * | 1/2022 | Harvey ............... | H05K 7/1477 |
| 2006/0042924 | A1 | * | 3/2006 | Ito ........................ | H01H 13/88 200/512 |
| 2014/0062933 | A1 | * | 3/2014 | Coulson ............... | G06F 3/0445 345/174 |

(Continued)

FOREIGN PATENT DOCUMENTS

| JP | 2015-114178 A | 6/2015 |
| KR | 10-1709671 B1 | 2/2017 |

(Continued)

OTHER PUBLICATIONS

Korean Office Action dated Mar. 27, 2020 in corresponding Korean Patent Application No. 10-2019-0059293 (6 pages in Korean).

*Primary Examiner* — Max H Noori
(74) *Attorney, Agent, or Firm* — NSIP Law

(57) ABSTRACT

A pressure sensor includes a substrate, a patterned circuit, and a conductive material layer. The patterned circuit, formed on the substrate, includes a first-path part and a second-path part of which at least a part is formed at a predetermined gap from at least a part of the first-path part. The conductive material layer, resiliently disposed on the patterned circuit, has protrusions. The conductive material layer deforms to determine a contact area between the protrusions and the substrate, and upon deformation of the conductive material layer to contact the first-path part, the gap between the first-path part and the second-path part, and the second-path part, the first-path part electrically connects to the second-path part.

15 Claims, 17 Drawing Sheets

(56) References Cited

U.S. PATENT DOCUMENTS

| | | | |
|---|---|---|---|
| 2015/0115426 A1* | 4/2015 | Lee | H01L 23/49503 |
| | | | 257/676 |
| 2018/0211934 A1* | 7/2018 | Ikeno | H01L 24/81 |
| 2019/0148653 A1* | 5/2019 | Chen | H01L 51/0097 |
| | | | 345/173 |
| 2020/0182903 A1* | 6/2020 | Tseng | G01P 15/18 |
| 2021/0066261 A1* | 3/2021 | Makita | H01L 33/483 |
| 2021/0285831 A1* | 9/2021 | Hotta | G01L 1/146 |
| 2022/0001847 A1* | 1/2022 | Masuda | H02P 3/025 |
| 2022/0003588 A1* | 1/2022 | Volkerink | H04L 67/12 |
| 2022/0008123 A1* | 1/2022 | Altmann | A61B 18/1206 |
| 2022/0008726 A1* | 1/2022 | Corey | A61N 1/025 |
| 2022/0011258 A1* | 1/2022 | Sekiya | G01N 27/4067 |
| 2022/0012580 A1* | 1/2022 | Srivastava | G11C 11/412 |

FOREIGN PATENT DOCUMENTS

| | | |
|---|---|---|
| KR | 10-1717062 B1 | 3/2017 |
| KR | 10-2017-0126302 A | 11/2017 |
| KR | 10-2019-0045460 A | 5/2019 |

\* cited by examiner

[FIG.1]
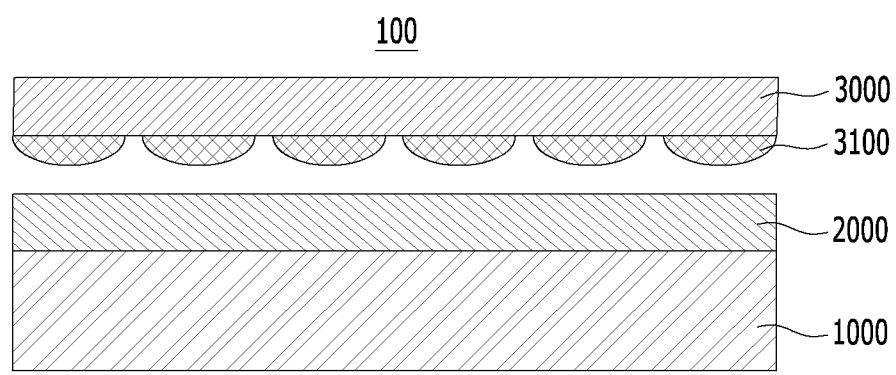

[FIG.2]
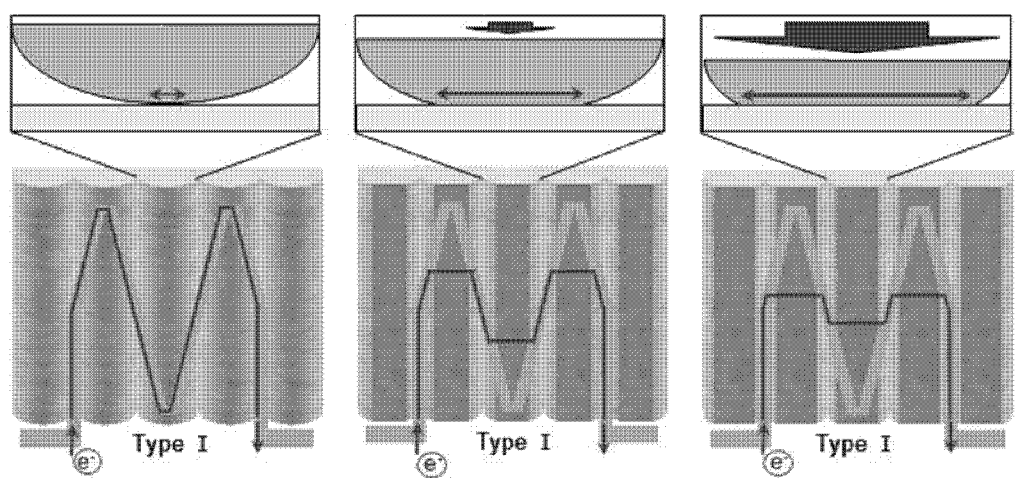

[FIG.3]
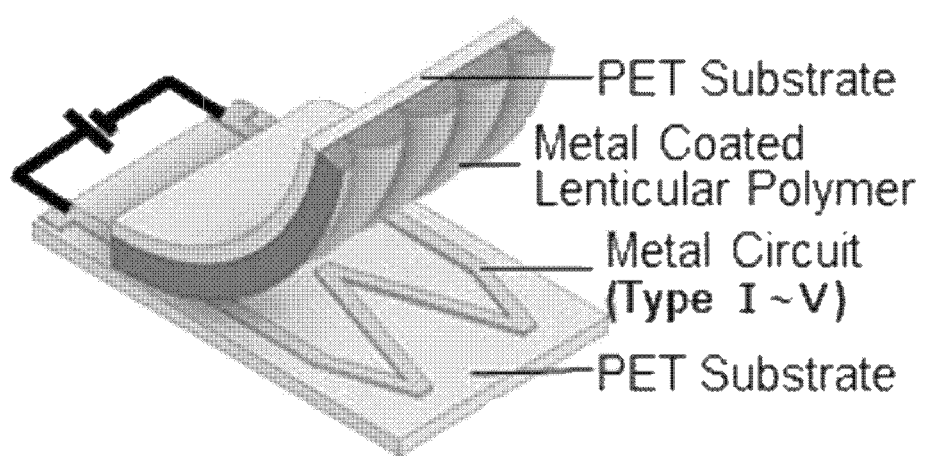

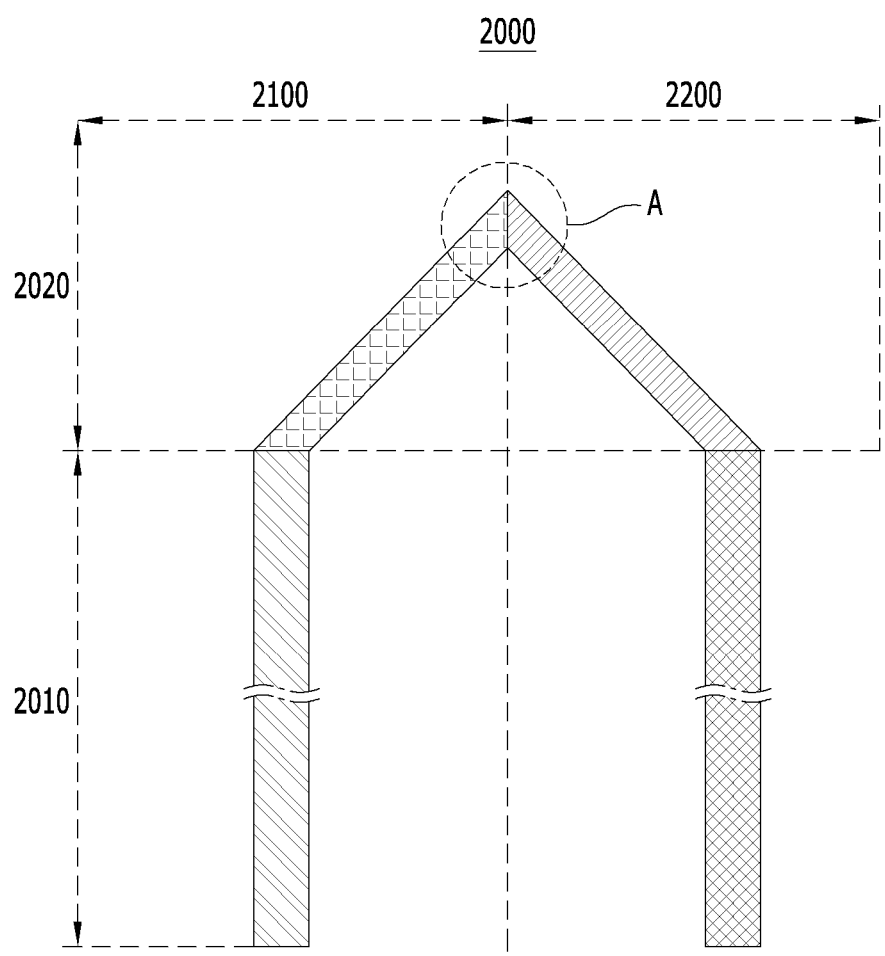

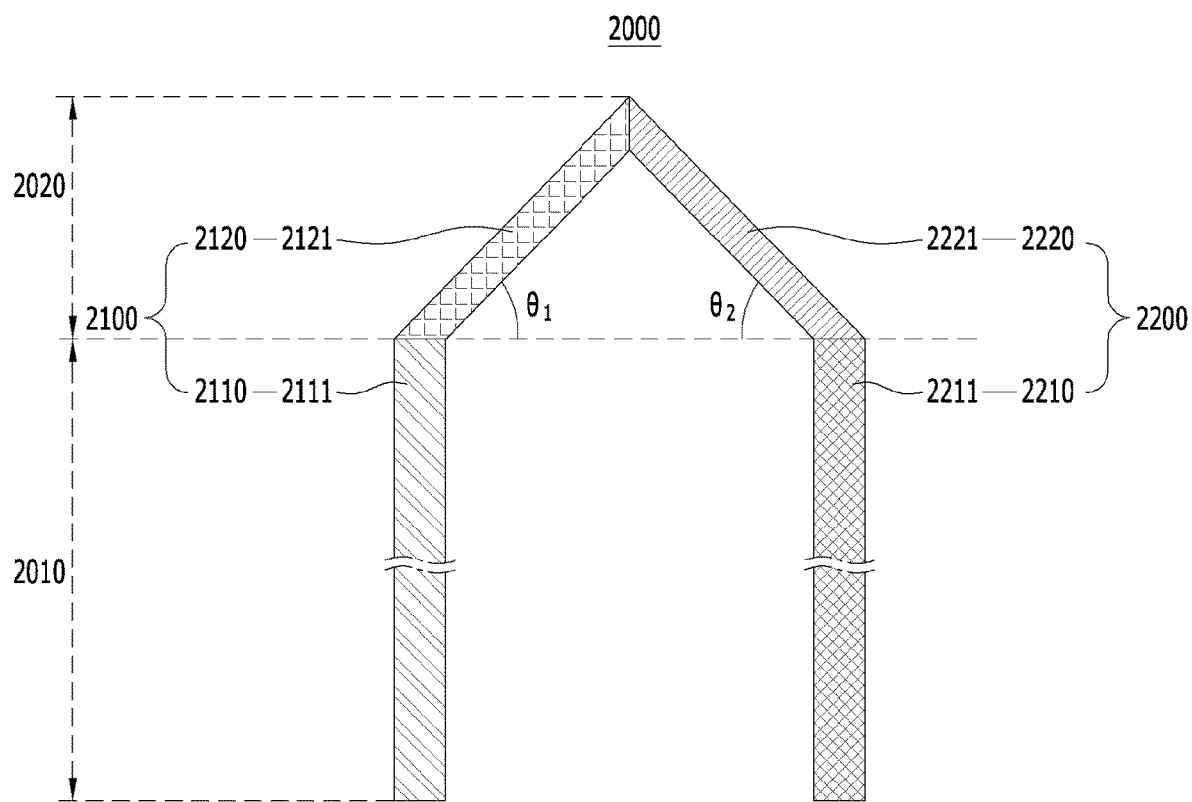
[FIG.5]

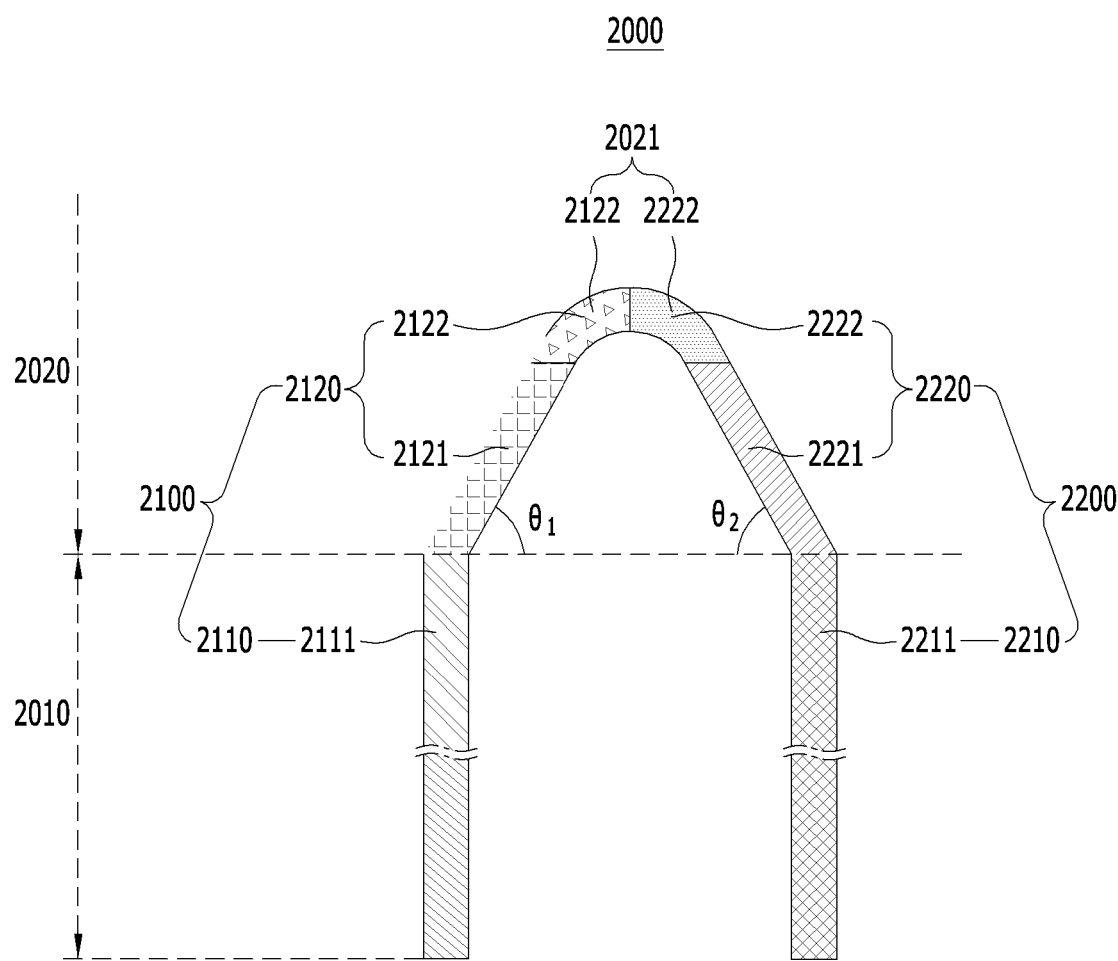

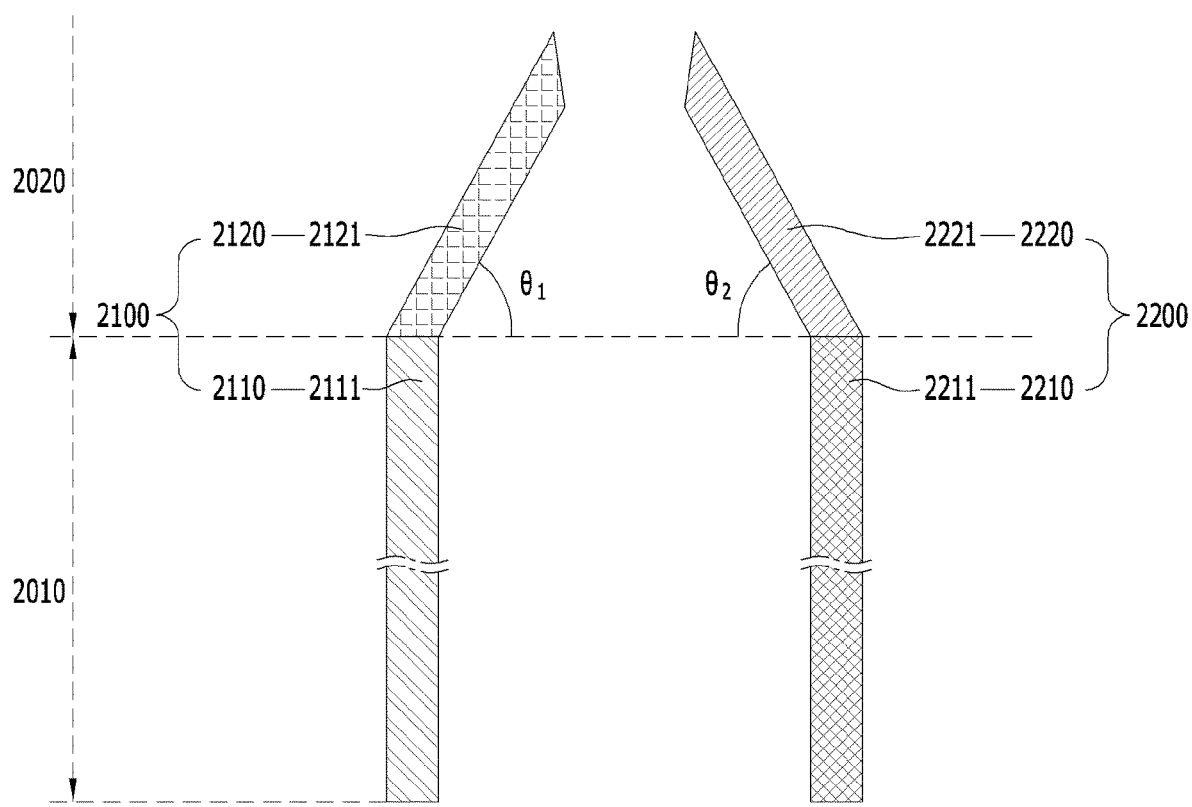
[FIG.7]

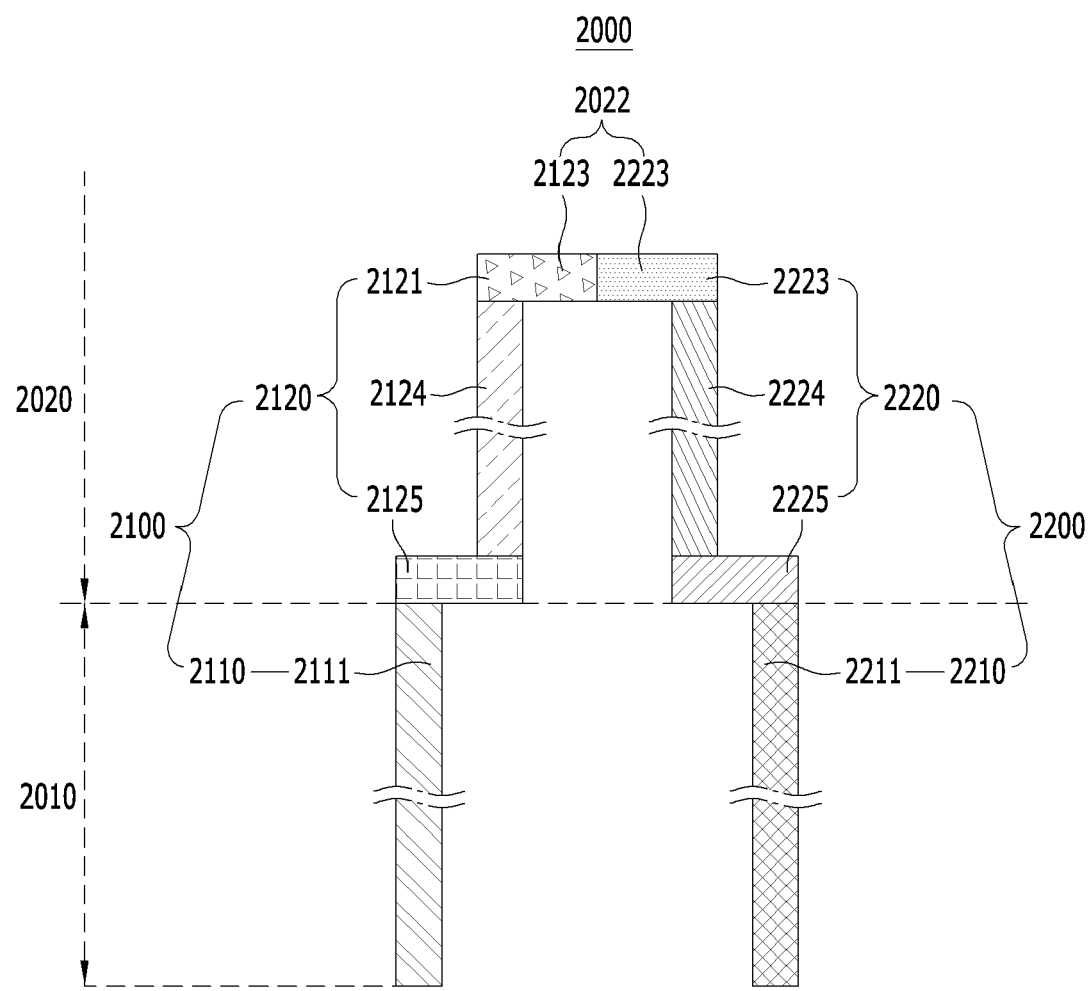
[FIG.8]

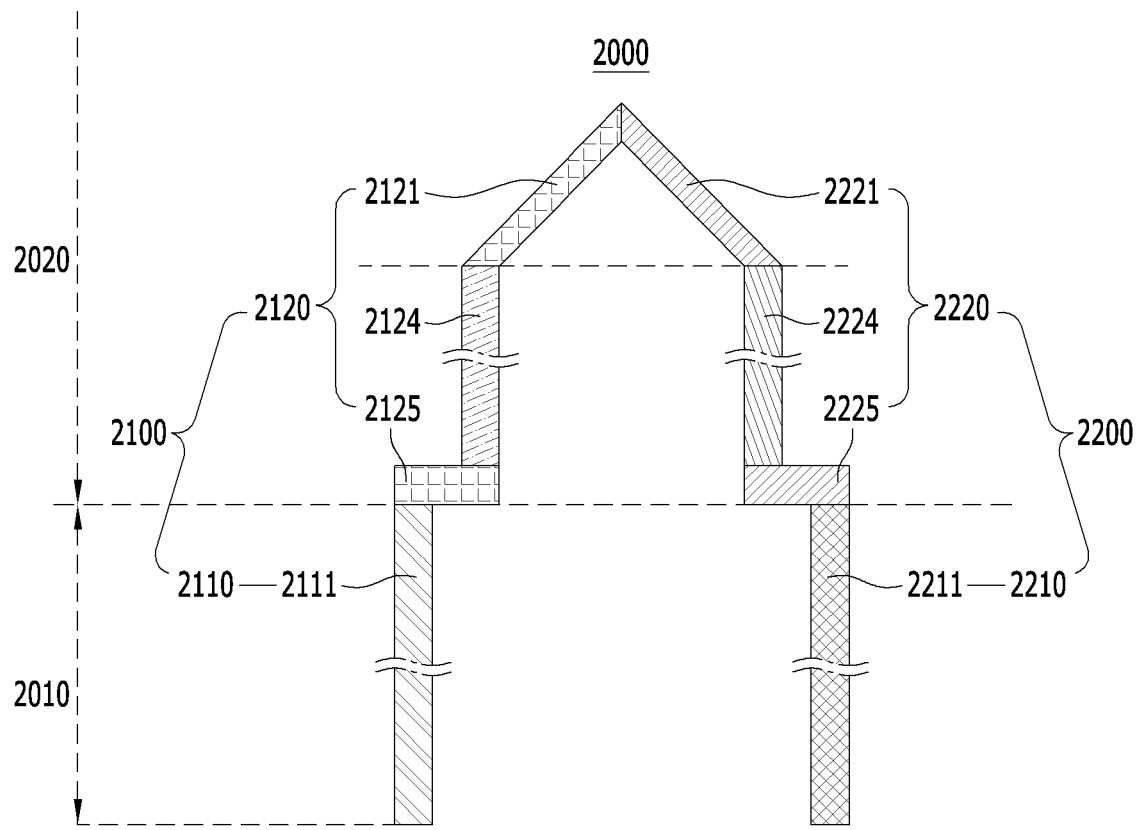
[FIG.9]

[FIG.10]
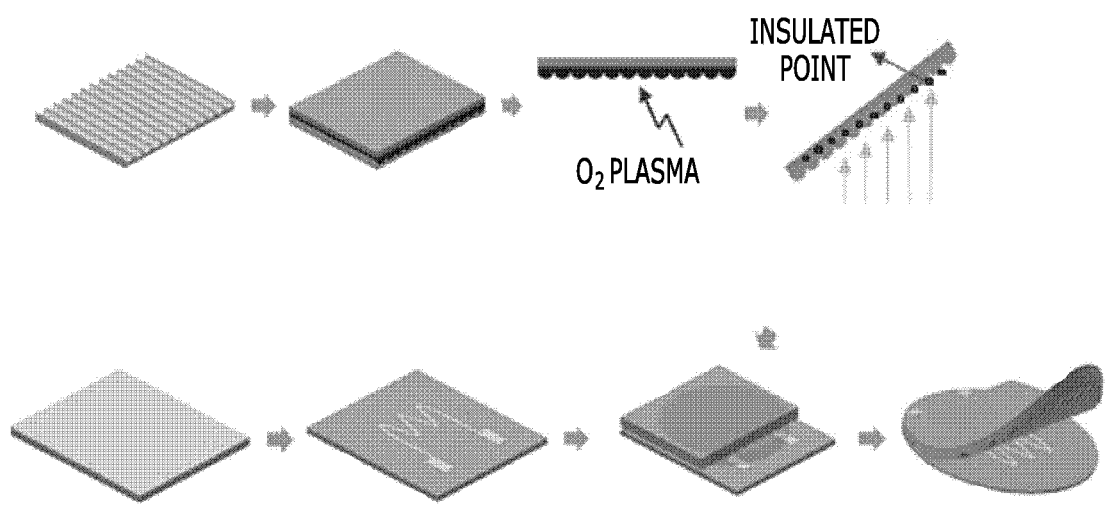

[FIG.11]
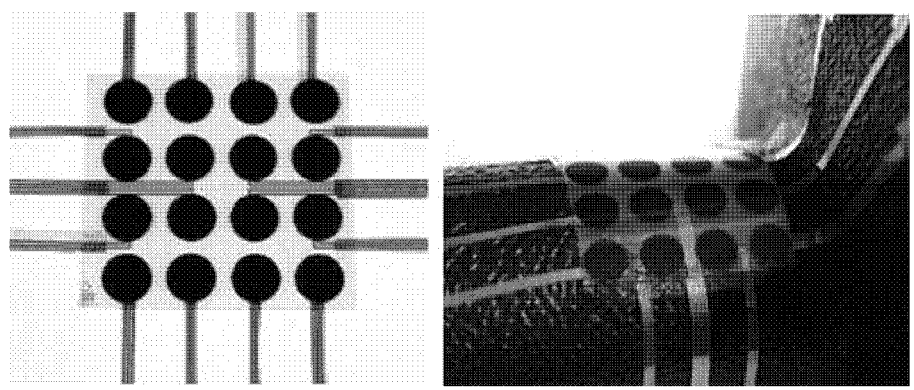

[FIG.12]
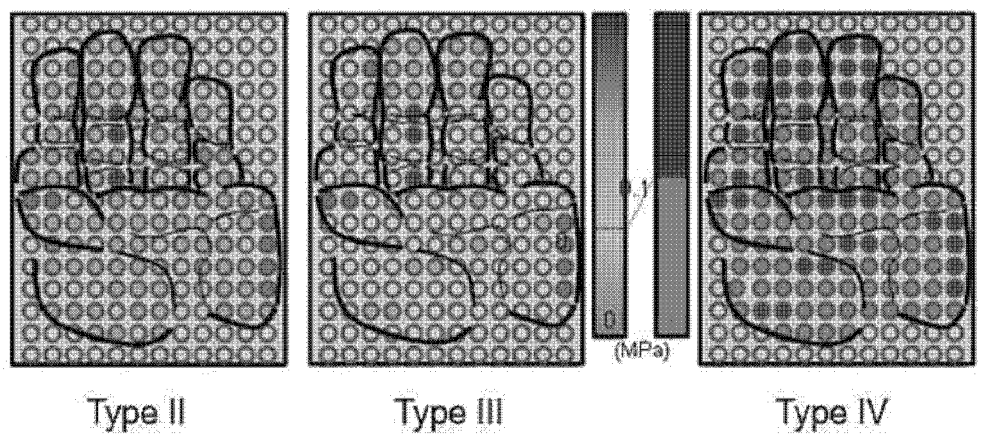

[FIG.13]
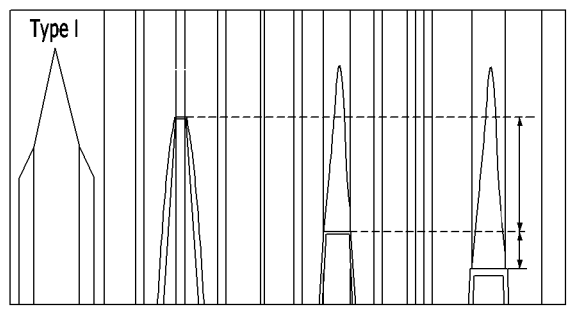 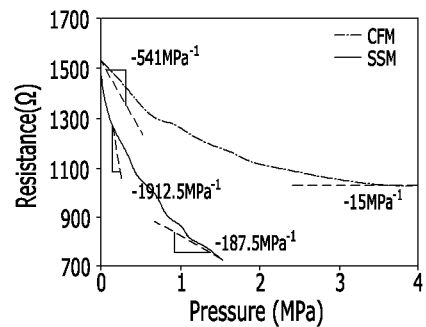
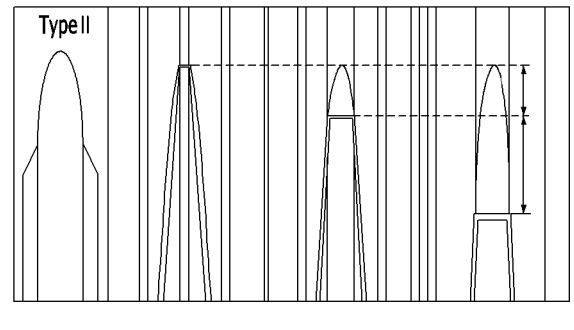 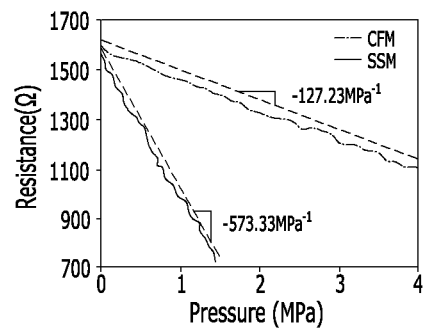

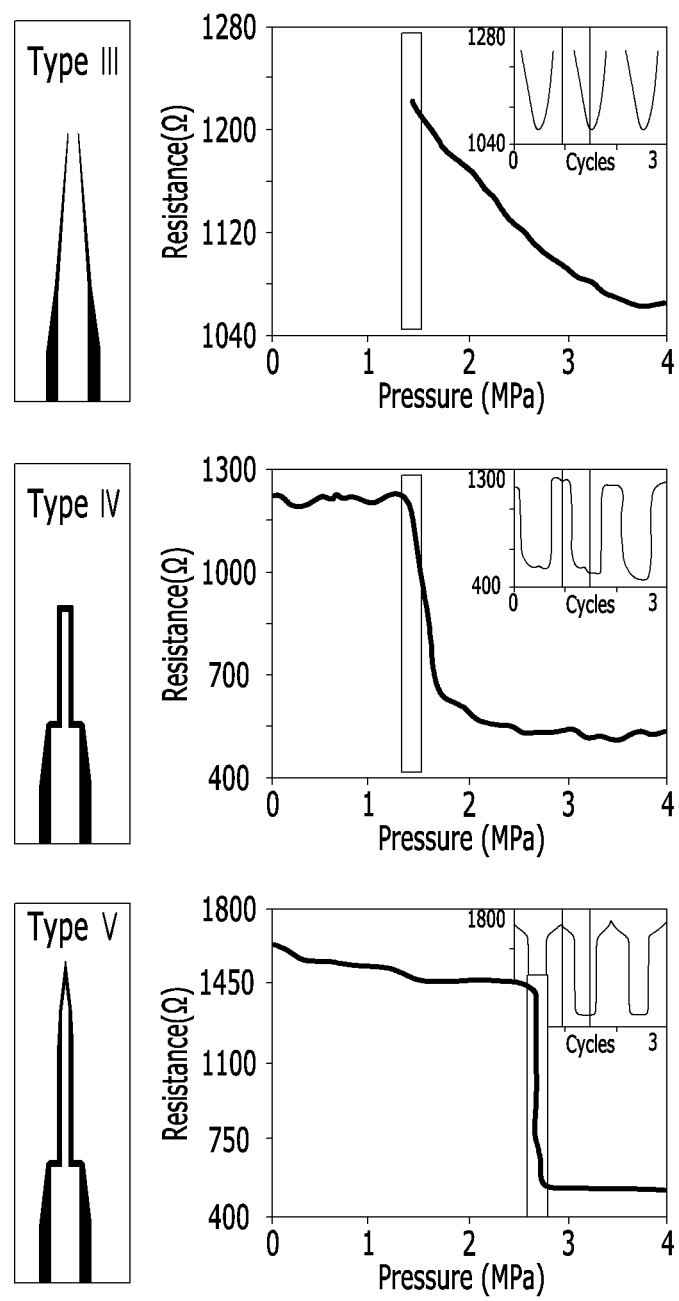
[FIG.14]

[FIG.15]
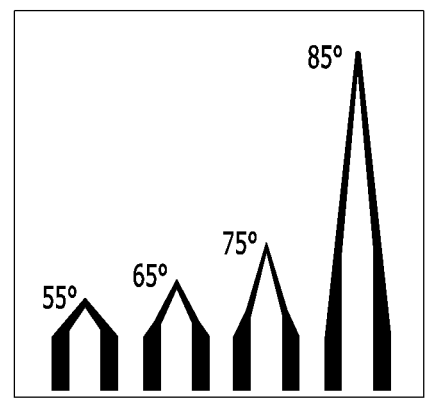
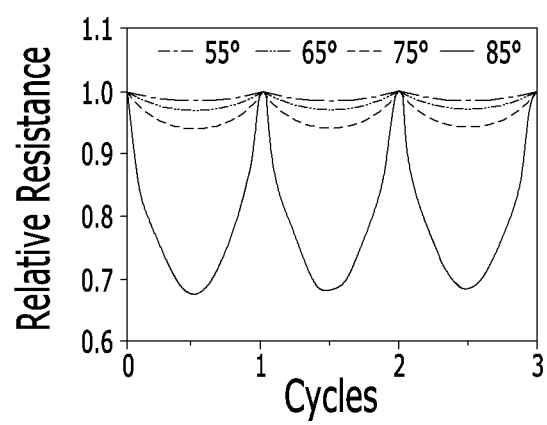
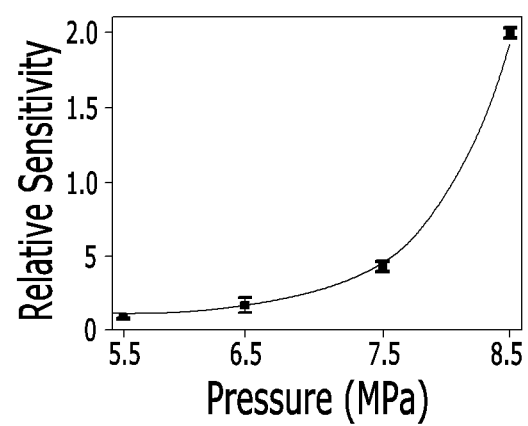

[FIG.16]
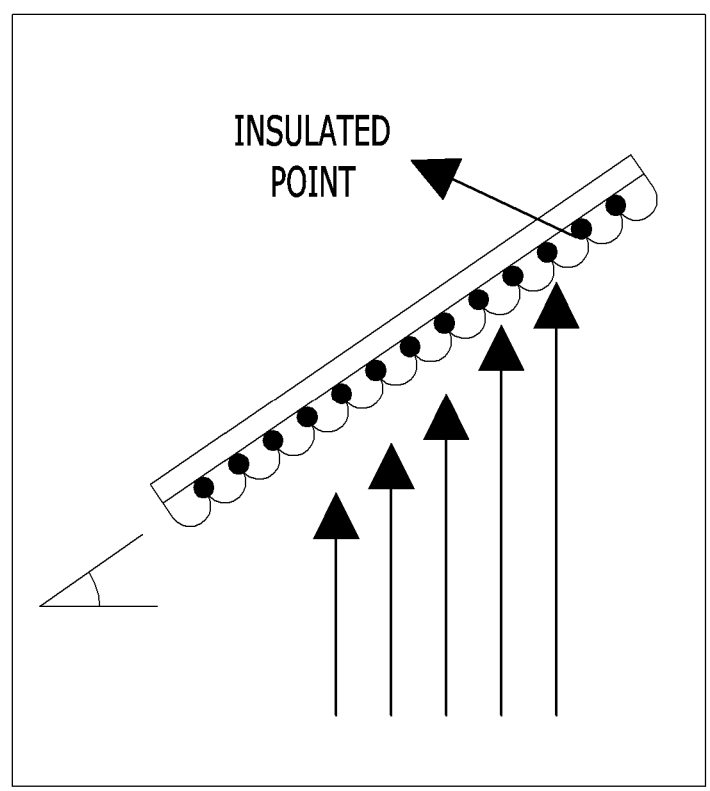

[FIG.17]
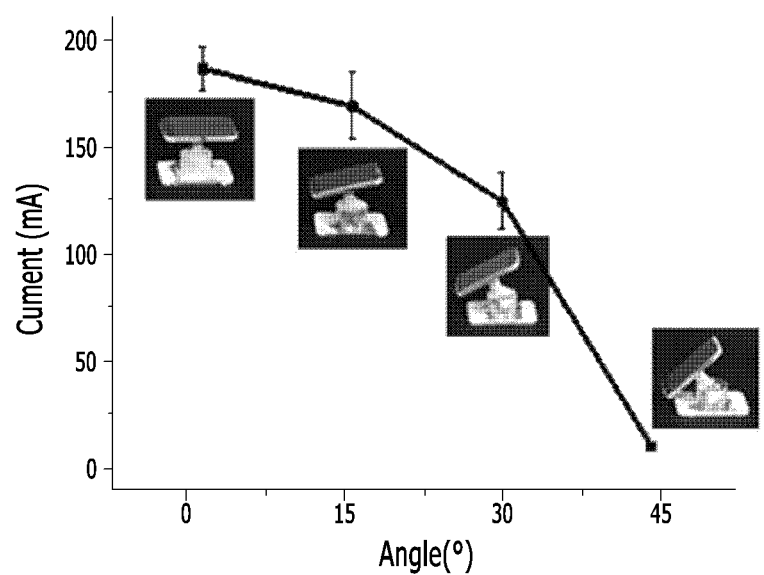

MULTI-TYPE PRESSURE SENSOR

CROSS-REFERENCE TO RELATED APPLICATION

This application claims the benefit under 35 USC 119(a) of Korean Patent Application No. 10-2019-0059293 filed May 21, 2019, in the Korean Intellectual Property Office, the entire disclosure of which is incorporated herein by reference for all purposes

BACKGROUND

1. Field

The following description relates to a multi-type pressure sensor.

2. Description of Related Art

A pressure sensor is a device that measures pressure based on a change in the flow of electric current caused by a change in resistance depending on the pressure applied in a vertical direction. Such a pressure sensor can be used to measure a wide range of pressure from low pressure to high pressure, such as the cylinder pressure of an engine of a ship or a car, the pressure of a fuel injection system, the pressure of hydrogen gas or air of a fuel cell vehicle, the pressure of exhaust gas in a silencer and pressures measured by other general industrial pressure gauges. Pressure sensors can be classified into a resonant pressure sensor, a piezoelectric pressure sensor, a strain-gauge pressure sensor, and a capacitive pressure sensor.

However, conventional pressure sensors are resistance pressure sensors which are configured only to measure applied pressure but not to ignore a pressure less than a predetermined level or perform selective pressure measurement. Therefore, when a conventional pressure sensor is used, it is necessary to measure a pressure first and then apply the pressure again where required or edit data through calculation, which causes inconvenience and requires an additional device for editing data. Also, most of the resistance pressure sensors are nonlinear pressure sensors, and a linear pressure sensor that does not require data editing can measure only a very narrow range of pressure.

Meanwhile, a strain-gauge pressure sensor has a low response speed and may have a significant error caused by temperature disturbance. Also, a piezoelectric pressure sensor can measure only a dynamic change of pressure, but cannot measure static pressure. Particularly, the piezoelectric pressure sensor shows different output values for the same pressure depending on the dynamic frequency of the system.

The background technology of the present disclosure is disclosed in Korean Patent Laid-open Publication No. 10-2016-0147418 which relates to a pressure sensor using an eddy current. In a conventional pressure sensor using eddy current, which is configured to measure the amount of change in eddy current according to the deformation of a diaphragm caused by external pressure, while overcoming the disadvantages of the strain-gauge pressure sensor or the piezoelectric pressure sensor, cannot function to perform selective pressure measurement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a pressure sensor includes a substrate, a patterned circuit, and a conductive material layer. The patterned circuit, formed on the substrate, includes a first-path part and a second-path part of which at least a part is formed at a predetermined gap from at least a part of the first-path part. The conductive material layer, resiliently disposed on the patterned circuit, has protrusions. The conductive material layer deforms to determine a contact area between the protrusions and the substrate, and upon deformation of the conductive material layer to contact the first-path part, the gap between the first-path part and the second-path part, and the second-path part, the first-path part electrically connects to the second-path part.

The protrusions may protrude from the conductive material layer downwards and extend in a longitudinal direction of the substrate and are arranged in a width direction of the substrate.

Each of the first-path part and the second-path part may include at least one of a first-line part extended in the longitudinal direction and a second-line part extended obliquely to the longitudinal direction. One side portion of each of the first-path part and the second-path part may include the first-line part and another side portion of each of the first-path part and the second-path part includes at least one of the first-line part and the second-line part. When the first-path part and the second-path part are electrically connected to each other by the conductive material layer, the conductive material layer may be in contact with at least a part of the other side portion of the first-path part and at least a part of the other side portion of the second-path part.

Each of the other side portion of the first-path part and the other side portion of the second-path part may include the second-line part. The second-line part on the other side portion of the first-path part may be extended obliquely to a second-line part of the second-path part. A second-line part on the other side portion of the second-path part may be extended obliquely to a second-line part of the first-path part.

The second-line part on the other side portion of the first-path part and the second-line part on the other side portion of the second-path part may be connected to each other.

The patterned circuit may further include a curved-connection part connecting the other end of the second-line part on the other side portion of the first-path part and the other end of the second-line part on the other side portion of the second-path part.

The second-line part on the other side portion of the first-path part and the second-line part on the other side portion of the second-path part may not be connected to each other.

Upon the second-line part on the other side portion of the first-path part and the second-line part on the other side portion of the second-path part having the same angle with respect to the width direction, as the angle increases, an electrical connection path between the first-path part and the second-path part formed by the conductive material layer may be shortened.

The other side portion of the first-path part and the other side portion of the second-path part may include the first-line parts, respectively. The patterned circuit may further include a linear-connection part extending in the width direction and connecting the first-line part on the other side portion of the first-path part and the first-line part on the other side portion of the second-path part, a first auxiliary-connection part connecting one end of the first-line part on the other side portion of the first-path part and the other end of a first-line part on one side portion of the first-path part, and a second auxiliary-connection part extending in the width direction and connecting one end of the first-line part on the other side portion of the second-path part and the other end of a first-line part on one side portion of the second-path part.

The other side portion of the first-path part and the other side portion of the second-path part may include the first-line parts each of which one end is connected to one side portion of the first-path part and one side portion of the second-path part, respectively, and the second-line parts each extended from the other side portion of the first-path part and the other side portion of the second-path part, respectively. The first-line parts on the other side portion of the first-path part and the other side portion of the second-path part may be located inner than the one side portion of the first-path part and the one side portion of the second-path part. The patterned circuit may include a first auxiliary-connection part extending in the width direction and connecting one end of the one side portion of the first-path part and the first-line part on the other side portion of the first-path part, and a second auxiliary-connection part extending in the width direction and connecting one end of the one side portion of the second-path part and the first-line part on the other side portion of the second-path part.

Upon a second-line part on the other side portion of the first-path part and a second-line part on the other side portion of the second-path part having the same angle with respect to the width direction, as the angle increases, an electrical connection path between the first-path part and the second-path part formed by the conductive material layer may be shortened.

The protrusions may have a shape selected from the group consisting of a lenticular shape, a cone shape, a pyramid shape, an elliptical hemisphere, a prism shape, a square column, and combinations thereof.

The conductive material layer may include a polymer coated with a conductive material or a conductive polymer.

The conductive material may include a material selected from the group consisting of PEDOT:PSS, Au, Pt, Ti, Ag, Ni, Zr, Ta, Zn, Nb, Cr, Co, Mn, Fe, Al, Mg, Si, W, Cu, lanthanum series metals, carbon nanotube (CNT), graphene, and combinations thereof.

The polymer may include a material selected from the group consisting of PUA (polyurethane-acrylate), PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof.

The conductive polymer may include a material selected from the group consisting of PEDOT (poly(3,4-ethylenedioxythiophene)), PEDOT:PSS (poly(3,4-ethylenedioxythiophene):poly(styrenesulfonate)), PPY (poly(pyrrole)), PANI (polyaniline), PT (poly(thiophene)), PAC (polyacetylene), PPV (poly(p-phenylene vinylene), P3HT (poly(3-hexylthiophene-2,5-diyl)), DPP (hydrogen-bonded diketopyrrolopyrrole), and combinations thereof.

The substrate may include a material selected from the group consisting of PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof.

Other features and aspects will be apparent from the following detailed description, the drawings, and the claims.

BRIEF DESCRIPTION OF THE DRAWINGS

FIG. 1 is a schematic diagram illustrating a pressure sensor according to an embodiment of the present disclosure.

FIG. 2 is a schematic diagram illustrating the operational principle of the pressure sensor according to an embodiment of the present disclosure.

FIG. 3 is a diagram illustrating the structure of the pressure sensor according to an embodiment of the present disclosure.

FIG. 4 is a schematic diagram illustrating a patterned circuit according to an embodiment of the present disclosure.

FIG. 5 is a schematic diagram illustrating the patterned circuit of Type 1 according to an embodiment of the present disclosure.

FIG. 6 is a schematic diagram illustrating the patterned circuit of Type 2 according to an embodiment of the present disclosure.

FIG. 7 is a schematic diagram illustrating the patterned circuit of Type 3 according to an embodiment of the present disclosure.

FIG. 8 is a schematic diagram illustrating the patterned circuit of Type 4 according to an embodiment of the present disclosure.

FIG. 9 is a schematic diagram illustrating the patterned circuit of Type 5 according to an embodiment of the present disclosure.

FIG. 10 illustrates a process of manufacturing a pressure sensor according to an example of the present disclosure.

FIG. 11 shows actual images of a pressure sensor according to an example of the present disclosure.

FIG. 12 shows the results of pressure distribution when the pressure sensors according to examples of the present disclosure are used.

FIG. 13 shows driving types and resistance characteristic curves of patterned circuits according to an example and a comparative example of the present disclosure.

FIG. 14 shows driving types and resistance characteristic curves of patterned circuits according to examples of the present disclosure.

FIG. 15 provides graphs showing the sensitivity of a patterned circuit according to an example of the present disclosure.

FIG. 16 shows the deposition angle of a pressure sensor according to an example of the present disclosure.

FIG. 17 is a graph showing the degree of insulation of a pressure sensor according to an example of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Through the whole document, the term "about or approximately" or "substantially" is intended to have meanings close to numerical values or ranges specified with an allowable error and intended to prevent accurate or absolute numerical values disclosed for the understanding of the present disclosure from being illegally or unfairly used by any unconscionable third party. Through the whole document, the term "step of" does not mean "step for."

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Further, in the explanation of the embodiments or examples of the present disclosure, the terms (longitudinal direction, one side of the longitudinal direction, the other side of the longitudinal direction, etc.) related to directions or positions are defined with reference to the arrangement of respective components illustrated in the drawings. By way of example, in FIG. 4 to FIG. 9, the 12 to 6 o'clock direction may be generally referred to as the longitudinal direction, the 6 o'clock position may be generally referred to as one side of the longitudinal direction, and the 12 o'clock position may be generally referred to as the other side of the longitudinal direction.

Through the whole document, a phrase in the form "A and/or B" means "A or B, or A and B".

Hereinafter, a multi-type pressure sensor of the present disclosure will be described in detail with reference to embodiments, examples, and drawings. However, the present disclosure is not limited to these embodiments, examples, and drawings.

FIG. 1 is a schematic diagram illustrating a pressure sensor 100 according to an embodiment of the present disclosure. FIG. 2 is a schematic diagram illustrating the operational principle of the pressure sensor 100 according to an embodiment of the present disclosure. FIG. 3 is a diagram illustrating the structure of the pressure sensor 100 according to an embodiment of the present disclosure.

FIG. 4 is a schematic diagram illustrating a patterned circuit 2000 according to an embodiment of the present disclosure.

According to a first aspect of the present disclosure, there is provided the pressure sensor 100, including a substrate 1000, a patterned circuit 2000 formed on the substrate 1000, and a conductive material layer 3000 provided on the patterned circuit 2000 and having protrusions 3100. The patterned circuit 2000 includes a first-path part 2100 and a second-path part 2200 of which at least a portion is formed at a predetermined gap from at least a part of the first-path part 2100. The conductive material layer 3000 is elastically deformed by a pressure to determine a contact area between the protrusions 3100 and the substrate 1000, and if the conductive material layer 3000 is elastically deformed by the pressure to be brought into contact with the first-path part 2100, the gap between the first-path part 2100 and the second-path part 2200, and the second-path part 2200, the first-path part 2100 and the second-path part 2200 are electrically connected to each other by the conductive material layer 3000.

Herein, the conductive material layer 3000 may be formed on a second substrate (not described), but may not be limited thereto.

A pressure sensor refers to a sensor configured to measure pressure. When pressure is applied to the pressure sensor, a substrate is deformed by the pressure and the flow of electric current is changed depending on the degree of contact between the substrate and a circuit, and, thus, the pressure can be measured.

A conventional pressure sensor can measure only pressure itself, but cannot perform on/off switching and selective pressure measurement. Meanwhile, the pressure sensor 100 of the present disclosure can measure pressure in various ways according to a pattern of the patterned circuit 2000.

Referring to FIG. 2 and FIG. 3, when pressure is applied to the pressure sensor 100, the conductive material layer 3000 and the protrusions 3100 are elastically deformed so that a contact area between the protrusions 3100 and the patterned circuit 2000 is changed. The change in contact area makes a change in the flow path of electric current flowing on the patterned circuit 2000. Thus, the pressure sensor 100 can sense the pressure.

In this example, the flow path of the electric current may not precisely match the patterned circuit 2000, and the electric current may flow through the contact area between the patterned circuit 2000 and the protrusions 3100.

As will be described later, the protrusions 3100 contains a non-conductive polymer material coated with a conductive material or a conductive polymer and thus can be elastically deformed by pressure.

According to an embodiment of the present disclosure, the protrusions 3100 may protrude from the conductive material layer 3000 downwards and extend in a longitudinal direction of the substrate 1000 and may be arranged in a width direction of the substrate 1000, but may not be limited thereto.

According to an embodiment of the present disclosure, the patterned circuit 2000 may include a plurality of first-path parts 2100 and a plurality of second-path parts 2200, but may not be limited thereto.

For example, if the patterned circuit 2000 of the pressure sensor 100 is patterned as indicated by A in FIG. 4, the patterned circuit 2000 may include a single first-path part 2100 and a single second-path part 2200, but may not be limited thereto.

According to an embodiment of the present disclosure, each of the first-path part 2100 and the second-path part 2200 may include at least one of a first-line part extended in the longitudinal direction and a second-line part extended obliquely to the longitudinal direction. One side portion 2010 of each of the first-path part 2100 and the second-path part 2200 may include the first-line part and another side portion 2020 of each of the first-path part 2100. The second-path part 2200 may include at least one of the first-line part and the second-line part. When the first-path part 2100 and the second-path part 2200 are electrically connected to each other by the conductive material layer 3000, the conductive material layer 3000 may be in contact with at least a part of the other side portion 2120 of the first-path part 2100 and at least a part of the other side portion 2220 of the second-path part 2200, but may not be limited thereto.

As will be described later, for example, a first-line part of FIG. 5 of the present disclosure refers to a first-line part 2111 on one side portion 2110 of the first-path part 2100 and a first-line part 2211 on one side portion 2210 of the second-path part 2200, which are extended in a longitudinal direction. A second-line part of FIG. 5 refers to a second-line part 2121 on the other side portion 2120 of the first-path part 2100 and a second-line part 2221 on the other side portion 2220 of the second-path part 2200.

For example, a first-line part of FIG. 6 refers to the first-line part 2111 on the one side portion 2110 of the first-path part 2100 and the first-line part 2211 on the one side portion 2210 of the second-path part 2200 which are extended in the longitudinal direction. A second-line part of FIG. 6 refers to the second-line part 2121 and a first curved-connection part 2122 on the other side portion 2120 of the first-path part 2100, and the second-line part 2221 and a second curved-connection part 2222 on the other side portion 2220 of the second-path part 2200.

For example, a first-line part of FIG. 7 refers to the first-line part 2111 on the one side portion 2110 of the first-path part 2100 and the first-line part 2211 on the one side portion 2210 of the second-path part 2200, which are extended in the longitudinal direction. A second-line part of FIG. 7 refers to the second-line part 2121 on the other side portion 2120 of the first-path part 2100 and the second-line part 2221 on the other side portion 2220 of the second-path part 2200.

For example, a first-line part of FIG. 8 refers to the first-line part 2111 on the one side portion 2110 of the first-path part 2100 and the first-line part 2211 on the one side portion 2210 of the second-path part 2200 which are extended in the longitudinal direction. A second-line part of FIG. 8 refers to a first-line part 2124, a first auxiliary-connection part 2125 and a first linear-connection part 2123 on the other side portion 2120 of the first-path part 2100, and a first-line part 2224, a second auxiliary-connection part 2225 and a second linear-connection part 2223 on the other side portion 2220 of the second-path part 2200.

For example, a first-line part of FIG. 9 refers to the first-line part 2111 on the one side portion 2110 of the first-path part 2100 and the first-line part 2211 on the one side portion 2210 of the second-path part 2200 which are extended in the longitudinal direction. A second-line part of FIG. 9 refers to the second-line part 2121, the first-line part 2124 and the first auxiliary-connection part 2125 on the other side portion 2120 of the first-path part 2100, and the second-line part 2221, the first-line part 2224 and the second auxiliary-connection part 2225 on the other side portion 2220 of the second-path part 2200.

Referring to FIG. 4, the one side portion 2010 refers to an area including the first-line part of the first-path part 2100 and the first-line part of the second-path part 2200, and the other side portion 2020 refers to an area including a second-line part of the first-path part 2100 and a second-line part of the second-path part 2200.

According to an embodiment of the present disclosure, each of the other side portion (common area for 2100 and 2020) of the first-path part and the other side portion (common area for 2200 and 2020) of the second-path part may include the second-line part. A second-line part on the other side portion (common area for 2100 and 2020) of the first-path part may be extended obliquely to a second-line part of the second-path part 2200. A second-line part on the other side portion (common area for 2200 and 2020) of the second-path part may be extended obliquely to a second-line part of the first-path part 2100, but may not be limited thereto.

If the pressure sensor 100 includes the patterned circuit 2000 illustrated in FIG. 5, the pressure sensor 100 may be identical to a general pressure sensor (Type 1).

FIG. 5 is a schematic diagram illustrating the patterned circuit 2000 of Type 1 according to an embodiment of the present disclosure.

According to an embodiment of the present disclosure, the second-line part 2121 on the other side portion 2120 of the first-path part 2100 and the second-line part 2221 on the other side portion 2220 of the second-path part 2200 may be connected, but may not be limited thereto.

Specifically, the pressure sensor 100 may include the patterned circuit 2000 in which the second-line part 2121 on the other side portion 2120 of the first-path part 2100 and the second-line part 2221 on the other side portion 2220 of the second-path part 2200 are connected. The pressure sensor 100, including the patterned circuit 2000, illustrated in FIG. 5 may measure a pressure applied to the pressure sensor 100 in a non-linear manner similar to the conventional pressure sensor.

If the pressure sensor 100 includes the patterned circuit 2000 illustrated in FIG. 6, the pressure sensor 100 may measure pressure in a linear manner (Type 2).

FIG. 6 is a schematic diagram illustrating the patterned circuit 2000 of Type 2 according to an embodiment of the present disclosure.

According to an embodiment of the present disclosure, the patterned circuit 2000 may further include a curved-connection part 2021 that connects the other end of the second-line part 2121 on the other side portion 2120 of the first-path part 2100 and the other end of the second-line part 2221 on the other side portion 2220 of the second-path part 2200, but may not be limited thereto.

According to an embodiment of the present disclosure, the patterned circuit 2000 of Type 2, according to an embodiment of the present disclosure, may have a generally curved shape unlike the patterned circuit 2000 of Type 1 according to an embodiment of the present disclosure, but may not be limited thereto.

Specifically, the pressure sensor 100 may include the second-line part 2121 and the first curved-connection part 2122 on the other side portion 2120 of the first-path part 2100, and the second-line part 2221 and the second curved-connection part 2222 on the other side portion 2220 of the second-path part 2200.

Herein, the first curved-connection part 2122 and the second curved-connection part 2222 refer to only an area of the curved-connection part 2021, but the curved-connection part 2021 does not refer to a mechanical or chemical combination of the first curved-connection part 2122 and the second curved-connection part 2222.

The pressure sensor 100 including the patterned circuit 2000 in which the other end of the second-line part 2121 on the other side portion 2120 of the first-path part 2100 and the other end of the second-line part 2221 on the other side portion 2220 of the second-path part 2200 are connected by the curved-connection part 2021 may measure a pressure applied to the pressure sensor 100 in a linear manner, unlike the conventional pressure sensor.

Referring to FIG. 5 and FIG. 6, a contact area between the patterned circuit 2000 and the protrusions 3100 in the patterned circuit 2000 illustrated in FIG. 5 changes in proportion to the square of pressure, whereas a contact area between the patterned circuit 2000 and the protrusions 3100 in the patterned circuit 2000 illustrated in FIG. 6 changes in proportion to the pressure. Therefore, the pressure sensor 100 illustrated in FIG. 5 may measure pressure in a non-linear manner, and the pressure sensor 100 illustrated in FIG. 6 may measure pressure in a linear manner.

If the pressure sensor 100 includes the patterned circuit 2000 illustrated in FIG. 7, the pressure sensor 100 may selectively measure only high pressure (Type 3).

FIG. 7 is a schematic diagram illustrating the patterned circuit 2000 of Type 3 according to an embodiment of the present disclosure.

According to an embodiment of the present disclosure, the second-line part 2121 on the other side portion 2120 of the first-path part 2100 and the second-line part 2221 on the other side portion 2220 of the second-path part 2200 may not be connected to each other, but may not be limited thereto.

For example, if a pressure equal to or less than a predetermined level is applied to the pressure sensor 100, a cutting edge of the second-line part 2121 on the other side portion 2120 of the first-path part 2100 is not in contact with a cutting edge of the second lien part 2221 on the other side portion 2220 of the second-path part 2200, and, thus, an electric current cannot flow on the pressure sensor 100. However, if a pressure equal to or more than a predetermined level is applied to the pressure sensor 100, the cutting edge of the second-line part 2121 on the other side portion 2120 of the first-path part 2100 is electrically connected to the cutting edge of the second lien part 2221 on the other side portion 2220 of the second-path part 2200 by the protrusions 3100, and, thus, an electric current can flow on the pressure sensor 100.

Therefore, the pressure sensor 100 including the patterned circuit 2000 in which the cutting edge of second-line part 2121 on the other side portion 2120 of the first-path part 2100 is not in contact with the cutting edge of the second lien part 2221 on the other side portion 2220 of the second-path part 2200 can measure only high pressure, the pressure sensor 100 illustrated in FIG. 7 is useful as a sensor for high-pressure measurement.

According to an embodiment of the present disclosure, if the second-line part 2121 on the other side portion 2120 of the first-path part 2100 and the second-line part 2221 on the other side portion 2220 of the second-path part 2200 have the same angle ($\theta 1, \theta 2$) with respect to the width direction, as the angle ($\theta 1, \theta 2$) increases, an electrical connection path between the first-path part 2100 and the second-path part 2200 formed by the conductive material layer 3000 may be shortened, but may not be limited thereto.

The protrusions 3100 may be brought into contact with the patterned circuit 2000 by pressure. A contact area between the first-path part 2100 and the second-path part 2200 between the protrusion 3100 and the patterned circuit 200 is changed depending on the amount of the pressure, and if an electric current flow along the contact area, the electrical connection path can be shortened or lengthened.

Specifically, if the angle ($\theta 1, \theta 2$) increases, the resistance of the pressure sensor 100 decreases, and thus, the sensitivity to pressure may increase.

If the pressure sensor 100 includes the patterned circuit 2000 illustrated in FIG. 8, the pressure sensor 100 may measure pressure as ON or OFF (Type 4).

FIG. 8 is a schematic diagram illustrating the patterned circuit 2000 of Type 4 according to an embodiment of the present disclosure.

According to an embodiment of the present disclosure, the other side portion 2120 of the first-path part 2100 and the other side portion 2220 of the second-path part 2200 may include the first-line parts 2125 and 2225, respectively. Further, the patterned circuit 2000 may further include a linear-connection part 2022 that is extended in the width direction and connects the first-line part 2124 on the other side portion 2120 of the first-path part 2100 and the first-line part 2224 on the other side portion 2220 of the second-path part 2200, the first auxiliary-connection part 2125 that connects one end of the first-line part 2124 on the other side portion 2120 of the first-path part 2100 and the other end of the first-line part 2111 on the one side portion 2110 of the first-path part 2100, and the second auxiliary-connection part 2225 that is extended in the width direction and connects one end of the first-line part 2224 on the other side portion 2220 of the second-path part 2200 and the other end of the first-line part 2211 on the one side portion 2210 of the second-path part 2200, but may not be limited thereto.

Specifically, the patterned circuit 2000 may include the first-line part 2124 on the other side portion 2120 of the first-path part 2100, the first-line part 2224 on the other side portion 2220 of the second-path part 2200, the linear-connection part 2022 that is extended in the width direction and formed by connecting the first linear-connection part 2123 of the first-line part 2124 on the other side portion 2120 of the first-path part 2100 and the second linear-connection part 2223 of the first-line part 2224 on the other side portion 2220 of the second-path part 2200, the first auxiliary-connection part 2125 connecting the one end of the first-line part 2124 on the other side portion 2120 of the first-path part 2100 and the other end of the first-line part 2111 on the one side portion 2110 of the first-path part 2100, and the second auxiliary-connection part 2225 that is extended in the width direction and connects the one end of the first-line part 2224 on the other side portion 2220 of the second-path part 2200 and the other end of the first-line part 2211 on the one side portion 2210 of the second-path part 2200.

Herein, the first linear-connection part 2123 and the second linear-connection part 2223 refer to only an area of the linear-connection part 2022, but the linear-connection part 2022 does not refer to a mechanical or chemical combination of the first linear-connection part 2123 and the second linear-connection part 2223.

Also, the first-line part 2124 on the other side portion 2120 of the first-path part 2100 may be in parallel with the first-line part 2224 on the other side portion 2220 of the second-path part 2200.

If a pressure equal to or less than a predetermined level is applied onto the pressure sensor 100, including the patterned circuit 2000, i.e., if the protrusions 3100 are not in contact with the patterned circuit 2000, an electric current does not flow on the pressure sensor 100. However, if a pressure equal to or more than a predetermined level is applied onto the pressure sensor 100 including the patterned circuit 2000, i.e., if the protrusions 3100 are in contact with the patterned circuit 2000, a contact area between the protrusions 3100 an the patterned circuit 2000 is irrelevant to the pressure, and, thus, the pressure sensor 100 may function as an ON/OFF pressure sensor capable of determining whether a pressure equal to or more than a predetermined level is applied.

If the pressure sensor 100 includes the patterned circuit 2000 illustrated in FIG. 9, the pressure sensor 100 may selectively measure only low pressure (Type 5).

FIG. 9 is a schematic diagram illustrating the patterned circuit 2000 of Type 5 according to an embodiment of the present disclosure.

According to an embodiment of the present disclosure, the other side portion 2120 of the first-path part 2100 and the other side portion 2220 of the second-path part 2200 may include the first-line parts 2124 and 2224 each of which one end is connected to the one side portion 2110 of the first-path part 2100 and the one side portion 2210 of the second-path part 2200, respectively. The second-line parts 2121 and 2221 each extended from the other side portion 2120 of the first-path part 2100 and the other side portion 2220 of the second-path part 2200, respectively. The first-line parts 2124 and 2224 on the other side portion 2120 of the first-path part 2100 and the other side portion 2220 of the second-path part 2200 may be located inner than the one side portion 2110 of the first-path part 2100 and the one side portion 2210 of the second-path part 2200. The patterned circuit 2000 may include the first auxiliary-connection part 2125 that is extended in the width direction and connects one end of the one side portion 2110 of the first-path part 2100 and the first-line part 2124 on the other side portion 2120 of the first-path part 2100 and the second auxiliary-connection part 2225 that is extended in the width direction and connects one end of the one side portion 2210 of the second-path part 2200 and the first-line part 2224 on the other side portion 2220 of the second-path part 2200, but may not be limited thereto.

Specifically, the other side portion 2120 of the first-path part 2100 includes the second-line part 2121 connecting the other side portion 2120 of the first-path part 2100 and the other side portion 2220 of the second-path part 2200, the first auxiliary-connection part 2125 connecting the one side portion 2110 and the other side portion 2120 of the first-path part 2100, and the first-line part 2125 on the other side portion 2120 of the first-path part 2100 that is located between the second-line part 2121 and the first auxiliary-connection part 2125 of the first-path part 2100 and connects the second-line part 2121 and the first auxiliary-connection part 2125 of the first-path part 2100.

Further, the other side portion 2220 of the second-path part 2200 may include the second-line part 2221 connecting the other side portion 2220 of the second-path part 2200 and the other side portion 2120 of the first-path part 2100, the second auxiliary-connection part 2225 connecting the one side portion 2210 and the other side portion 2220 of the second-path part 2200, and the first-line part 2225 on the other side portion 2220 of the second-path part 2200 that is located between the second-line part 2221 and the second auxiliary-connection part 2225 of the second-path part 2200 and connects the second-line part 2221 and the second auxiliary-connection part 2225 of the second-path part 2200.

Herein, the first-line part 2124 on the other side portion 2120 of the first-path part 2100 may be in parallel with the first-line part 2224 on the other side portion 2220 of the second-path part 2200.

Referring to FIG. 9, it can be seen that the pressure sensor 100, including the patterned circuit 2000, is partially sharp and partially separated in parallel with a predetermined space. The patterned circuit 2000, illustrated in FIG. 9 includes some of the characteristics of the patterned circuit 2000, illustrated in FIG. 5 and FIG. 8. Therefore, the pressure sensor 100 including the patterned circuit 2000 illustrated in FIG. 9 may operate in the same manner as a general pressure sensor at a pressure equal to or less than a predetermined level, but is not changed in resistance at a pressure equal to or more than the predetermined level. That is, the pressure sensor, including the patterned circuit 2000 illustrated in FIG. 9 cannot measure a pressure equal to or more than the predetermined level and thus serves as a sensor for low-pressure measurement.

According to an embodiment of the present disclosure, if the second-line part 2121 on the other side portion 2120 of the first-path part 2100 and the second-line part 2221 on the other side portion 2220 of the second-path part 2200 have the same angle with respect to the width direction, as the angle increases, an electrical connection path between the first-path part 2100 and the second-path part 2200 formed by the conductive material layer 3000 may be shortened, but may not be limited thereto.

In summary, the patterned circuit 2000 includes the first-line parts 2111, 2124, 2211 and 2225 extended in the longitudinal direction of the substrate 1000 and the second-line parts 2121, 2122, 2125, 2215, 2221, 2222, 2225 and 2223 extended obliquely to the longitudinal direction of the substrate 1000, and at least a part of the other side portion 2120 of the first-path part 2100 may be in contact with at least a part of the other side portion 2220 of the second-path part 2200, but may not be limited thereto.

Also, the pressure sensor 100, according to the present disclosure, may measure pressure in various ways depending on the shape of the patterned circuit 2000. That is, if patterned circuits 2000, different from each other, are placed and integrated into the pressure sensor 100, when pressure is applied once to the pressure sensor 100, the pressure sensor 100 may measure the pressure in at most four ways.

Herein, the sensitivity of the patterned circuit 2000 may be changed depending on the shape and material of the protrusions 3100.

According to an embodiment of the present disclosure, the protrusions 3100 may have a shape selected from the group consisting of lenticular shape, a cone shape, a pyramid shape, an elliptical hemisphere, a prism shape, a square column, and combinations thereof, but may not be limited thereto.

According to an embodiment of the present disclosure, the conductive material layer 3000 may contain a polymer coated with a conductive material or a conductive polymer, but may not be limited thereto.

According to an embodiment of the present disclosure, the protrusions 3100 may be formed of the same material as the conductive material layer 3000, but may not be limited thereto.

According to an embodiment of the present disclosure, the conductive material may include a material selected from the group consisting of PEDOT:PSS, Au, Pt, Ti, Ag, Ni, Zr, Ta, Zn, Nb, Cr, Co, Mn, Fe, Al, Mg, Si, W, Cu, lanthanum series metals, carbon nanotube (CNT), graphene, and combinations thereof, but may not be limited thereto.

According to an embodiment of the present disclosure, the polymer may include a material selected from the group consisting of PUA (polyurethane-acrylate), PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof, but may not be limited thereto.

According to an embodiment of the present disclosure, the conductive polymer may include a material selected from the group consisting of PEDOT (poly(3,4-ethylenedioxythiophene)), PEDOT:PSS (poly(3,4-ethylenedioxythiophene):poly(styrenesulfonate)), PPY (poly(pyrrole)), PANI (polyaniline), PT (poly(thiophene)), PAC (polyacetylene), PPV (poly(p-phenylene vinylene), P3HT (poly(3-hexylthiophene-2,5-diyl)), DPP (hydrogen-bonded diketopyrrolopyrrole), and combinations thereof, but may not be limited thereto.

According to an embodiment of the present disclosure, the conductive material layer 3000 containing the polymer coated with the conductive material may include insulated points that refer to points not coated with the conductive material, but may not be limited thereto.

A pattern of the protrusions 3100 is partially insulated. If insulation does not occur in the protrusions 3100, an electric current flowing on the pressure sensor 100 does not flow along the circuit but flows regardless of a contact area between the protrusions 3100 and the patterned circuit 2000. Thus, the pressure sensor 100 cannot sense pressure.

The insulated points function to insulate patterns of the protrusions 3100 of the conductive material layer 3000 and thus suppress the flow of the electric current on the pressure sensor 100 only through the protrusions 3100 without passing through the patterned circuit 2000.

According to an embodiment of the present disclosure, each of the substrate 1000 and the second substrate (not described) may independently include a material selected from the group consisting of PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof, but may not be limited thereto.

Hereinafter, the present disclosure will be described in more detail with reference to examples. The following examples are provided only for explanation, but do not intend to limit the scope of the present disclosure.

FIG. 10 illustrates a process of manufacturing a pressure sensor according to an example of the present disclosure.

Referring to FIG. 10, the pressure sensor may be manufactured by forming a circuit on a PET substrate on which metal has been deposited through photolithography; molding PUA on another PET substrate different from the PET substrate and forming a lenticular pattern by demolding the PUA; forming a conductive material layer by depositing metal on the lenticular pattern using O2 plasma; and attaching, aligning and cutting lenticular protrusions of the conductive material layer to be in contact with the circuit.

The following examples and comparative examples may be classified by the shape of the circuit and the kind of the PUA.

Example 1

A metal circuit of Type 1, as shown in FIG. 5, was formed on a PET substrate, and metal-coated PUA(CFM) having a lenticular shape was formed on another PET substrate.

Example 2

A metal circuit of Type 2, as shown in FIG. 6, was formed on a PET substrate, and metal-coated PUA(CFM) having a lenticular shape was formed on another PET substrate.

Example 3

A metal circuit of Type 3, as shown in FIG. 7, was formed on a PET substrate, and metal-coated PUA(CFM) having a lenticular shape was formed on another PET substrate.

Example 4

A metal circuit of Type 4, as shown in FIG. 8, was formed on a PET substrate, and metal-coated PUA(CFM) having a lenticular shape was formed on another PET substrate.

Example 5

A metal circuit of Type 5, as shown in FIG. 9, was formed on a PET substrate, and metal-coated PUA(CFM) having a lenticular shape was formed on another PET substrate.

Comparative Example 1

A metal circuit of Type 5, as shown in FIG. 5, was formed on a PET substrate, and metal-coated PUA(SSM) having a lenticular shape was formed on another PET substrate.

Comparative Example 2

A metal circuit of Type 2, as shown in FIG. 6, was formed on a PET substrate, and metal-coated PUA(SSM) having a lenticular shape was formed on another PET substrate.

Test Example 1

FIG. 11 shows actual images of a pressure sensor according to an example of the present disclosure. FIG. 12 shows the results of pressure distribution when the pressure sensors, according to examples of the present disclosure, are used. Specifically, FIG. 12 shows a pressure distribution plot when the pressure sensor shown in FIG. 11 is grabbed by a hand and applied with pressure.

Referring to FIG. 11 and FIG. 12, it can be seen that the pressure sensors according to Examples 2 to 4 of the present disclosure have different characteristics from each other. For example, the pressure sensor according to Example 2 measured all pressures, whereas the pressure sensor according to Example 2 reacted to a pressure equal to or more than a predetermined level but could not sense a pressure equal to or less than a predetermined level. Also, it can be seen that the pressure sensor, according to Example 4 can sense a pressure applied to the pressure sensor only as ON or OFF.

Test Example 2

FIG. 13 shows driving types and resistance characteristic curves of patterned circuits according to an example and a comparative example of the present disclosure, and FIG. 14 shows driving types and resistance characteristic curves of patterned circuits according to examples of the present disclosure.

Referring to FIG. 13, it can be seen that the pressure sensor according to Example 1 (Type 1) of the present disclosure shows a non-linear change in resistance with pressure, whereas the pressure sensor according to Example 2 (Type 2) shows a linear change in resistance with pressure.

Also, referring to FIG. 13, it can be seen that even when the patterned circuits are identical to each other in shape, if there are differences in materials of the conductive material layer and the protrusions, there is a difference in the amount of change in resistance with pressure. That is, the performance of the pressure sensor may vary depending on the material of the conductive material layer.

Referring to FIG. 14, it can be seen that as for the pressure sensor according to Example 3 (Type 3) of the present disclosure, resistance is not measured in a low-pressure range based on a pressure of about 1.3 MPa, but a resistance decreases as pressure increases in a high-pressure range. This means that when a pressure equal to or less than a predetermined level is applied, an electrical connection path is not formed, and thus, the patterned circuit of Example 3 cannot sense low pressure. That is, it can be seen that the pressure sensor, according to Example 3 (Type 3) of the present disclosure, is a sensor that is configured to selectively measure high pressure but cannot measure low pressure.

Further, it can be seen that as for the pressure sensor according to Example 4 (Type 4) of the present disclosure, a resistance is changed from a high value to a low value based on a pressure of about 1.5 MPa, but the change in resistance with pressure is very small. This proves that the pressure sensor, according to Example 4 (Type 4) of the present disclosure, is an ON/OFF pressure sensor.

Furthermore, it can be seen that as for the pressure sensor according to Example 5 (Type 5) of the present disclosure, a resistance is changed in a low-pressure range based on a pressure of about 2.8 MPa, whereas a resistance is barely changed in a high pressure range. That is, it can be seen that the pressure sensor according to Example 5 (Type 5) of the present disclosure is a sensor configured to selectively measure only low pressure.

Test Example 3

FIG. 15 provides graphs showing the sensitivity of a patterned circuit according to an example of the present disclosure.

Referring to FIG. 5, FIG. 6, FIG. 7, FIG. 9 and FIG. 15, it can be seen that as the slope of the patterned circuit increases and becomes sharper, i.e., as θ1 and θ2 in FIG. 5, FIG. 6 and FIG. 7 become closer to a right angle, the amount of change in relative resistance increases.

Therefore, it can be seen that as the angle of the patterned circuit increases and becomes sharper, the sensitivity of the circuit increases, and, thus, the pressure sensor is sensitive to pressure.

Test Example 4

FIG. 16 shows the deposition angle of a pressure sensor according to an example of the present disclosure, and FIG. 17 is a graph showing the degree of insulation of a pressure sensor according to an example of the present disclosure.

Referring to FIG. 2, FIG. 16 and FIG. 17, if a metal is not deposited between lenticular patterns of protrusions of the pressure sensor and insulated points are formed, an electric current does not flow along a patterned circuit of the pressure sensor but may flow along a shorter path.

Also, it can be seen that when metal is deposited on the lenticular patterns, as the deposition angle increases, some portions between the lenticular patterns are hidden, and the metal cannot be deposited on these portions, and, thus, insulating properties increase.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

We claim:

1. A pressure sensor, comprising:
    a substrate;
    a patterned circuit, formed on the substrate, and comprising a first-path part and a second-path part, wherein at least a part of the second-path part is formed at a predetermined gap from at least a part of the first-path part; and
    a conductive material layer, resiliently disposed on the patterned circuit, and having protrusions that protrude downward from the conductive material layer, extend in a longitudinal direction of the substrate, and are arranged in a width direction of the substrate,
    wherein the conductive material layer is elastically deformed by a pressure to determine a contact area between the protrusions and the substrate, and when the conductive material layer is elastically deformed by the pressure to contact the first-path part, the gap between the first-path part and the second-path part, and the second-path part, the first-path part is electrically connected to the second-path part by the conductive material layer,
    wherein each of the first-path part and the second-path part includes at least one of a first-line part extended in the longitudinal direction and a second-line part extended obliquely to the longitudinal direction, and one side portion of each of the first-path part and the second-path part includes the first-line part, and the other side portion of each of the first-path part and the second-path part includes at least one of the first-line part and the second-line part, and
    wherein when the first-path part and the second-path part are electrically connected to each other by the conductive material layer, the conductive material layer is in contact with at least a part of the other side portion of the first-path part and at least a part of the other side portion of the second-path part.

2. The pressure sensor of claim 1, wherein the substrate includes a material selected from the group consisting of PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof.

3. The pressure sensor of claim 1, wherein the conductive material layer comprises a polymer coated with a conductive material or a conductive polymer.

4. The pressure sensor of claim 1, wherein each of the other side portion of the first-path part and the other side portion of the second-path part includes the second-line part, and
    a second-line part on the other side portion of the first-path part is extended obliquely to a second-line part of the second-path part, and
    a second-line part on the other side portion of the second-path part is extended obliquely to a second-line part of the first-path part.

5. The pressure sensor of claim 4, wherein the second-line part on the other side portion of the first-path part and the second-line part on the other side portion of the second-path part are connected to each other.

6. The pressure sensor of claim 4, wherein the patterned circuit further includes a curved-connection part connecting the other end of the second-line part on the other side portion of the first-path part and the other end of the second-line part on the other side portion of the second-path part.

7. The pressure sensor of claim 4, wherein the second-line part on the other side portion of the first-path part and the second-line part on the other side portion of the second-path part are not connected to each other.

8. The pressure sensor of claim 4, wherein upon the second-line part on the other side portion of the first-path part and the second-line part on the other side portion of the second-path part having the same angle with respect to the width direction, as the angle increases, an electrical connection path between the first-path part and the second-path part formed by the conductive material layer is shortened.

9. The pressure sensor of claim 1, wherein the other side portion of the first-path part and the other side portion of the second-path part include the first-line parts, respectively, and
    the patterned circuit further includes a linear-connection part extending in the width direction and connecting the first-line part on the other side portion of the first-path part and the first-line part on the other side portion of the second-path part, a first auxiliary-connection part connecting one end of the first-line part on the other side portion of the first-path part and the other end of a first-line part on one side portion of the first-path part, and a second auxiliary-connection part extending in the width direction and connecting one end of the first-line part on the other side portion of the second-path part and the other end of a first-line part on one side portion of the second-path part.

10. The pressure sensor of claim 1, wherein the other side portion of the first-path part and the other side portion of the second-path part include the first-line parts each of which one end is connected to one side portion of the first-path part and one side portion of the second-path part, respectively, and the second-line parts each extended from the other side portion of the first-path part and the other side portion of the second-path part, respectively, and
    the first-line parts on the other side portion of the first-path part and the other side portion of the second-path part are located inner than the one side portion of the first-path part and the one side portion of the second-path part, and
    the patterned circuit includes a first auxiliary-connection part extending in the width direction and connecting one end of the one side portion of the first-path part and the first-line part on the other side portion of the first-path part, and a second auxiliary-connection part extending in the width direction and connecting one end of the one side portion of the second-path part and the first-line part on the other side portion of the second-path part.

11. The pressure sensor of claim 10, wherein upon a second-line part on the other side portion of the first-path part and a second-line part on the other side portion of the second-path part having the same angle with respect to the width direction, as the angle increases, an electrical connection path between the first-path part and the second-path part formed by the conductive material layer is shortened.

12. The pressure sensor of claim 1, wherein the protrusions have a shape selected from the group consisting of a lenticular shape, a cone shape, a pyramid shape, an elliptical hemisphere, a prism shape, a square column, and combinations thereof.

13. The pressure sensor of claim 3, wherein the conductive material includes a material selected from the group consisting of PEDOT:PSS, Au, Pt, Ti, Ag, Ni, Zr, Ta, Zn, Nb, Cr, Co, Mn, Fe, Al, Mg, Si, W, Cu, lanthanum series metals, carbon nanotube (CNT), graphene, and combinations thereof.

14. The pressure sensor of claim 3, wherein the polymer includes a material selected from the group consisting of PUA (polyurethane-acrylate), PET (polyethylene terephthalate), PE (polyethylene), PP (polypropylene), PBT (polybutylene terephthalate), PTT (polytrimethylene terephthalate), PI (polyimide), PA (polyamide), PU (poly urethane), PVDF (polyvinylidene fluoride), PDMS (polydimethylsiloxane), PB (polybutadiene), PUA (polyurethane-acrylate), SBR (styrene butadiene rubber), PVDF-TrFE (polyvinylidene fluoride-trifluoroethylene), and combinations thereof.

15. The pressure sensor of claim 3, wherein the conductive polymer includes a material selected from the group consisting of PEDOT (poly(3,4-ethylenedioxythiophene)), PEDOT:PSS (poly(3,4-ethylenedioxythiophene):poly(styrenesulfonate)), PPY (poly(pyrrole)), PANI (polyaniline), PT (poly(thiophene)), PAC (polyacetylene), PPV (poly(p-phenylene vinylene), P3HT (poly(3-hexylthiophene-2,5-diyl)), DPP (hydrogen-bonded diketopyrrolopyrrole), and combinations thereof.

\* \* \* \* \*